(12) United States Patent
Dolbakian et al.

(10) Patent No.: US 10,969,928 B2
(45) Date of Patent: Apr. 6, 2021

(54) CONTEXTUAL LAUNCH INTERFACES

(71) Applicant: Amazon Technologies, Inc., Seattle, WA (US)

(72) Inventors: Levon Dolbakian, Los Gatos, CA (US); Arnaud Marie Froment, San Jose, CA (US); Gy Stuart Fullmer, Santa Cruz, CA (US); Sean Thomas Congden, Mountain View, CA (US); Brett Nathan Lynnes, Sunnyvale, CA (US); Nadim Awad, San Francisco, CA (US); Kenneth Paul Kiraly, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/383,180

(22) Filed: Apr. 12, 2019

(65) Prior Publication Data
US 2019/0369842 A1 Dec. 5, 2019

Related U.S. Application Data

(63) Continuation of application No. 14/488,001, filed on Sep. 16, 2014, now Pat. No. 10,261,672.

(51) Int. Cl.
*G06F 3/048* (2013.01)
*G06F 3/0481* (2013.01)
*G06F 3/0488* (2013.01)
*G06F 3/0482* (2013.01)

(52) U.S. Cl.
CPC ........ *G06F 3/04817* (2013.01); *G06F 3/0482* (2013.01); *G06F 3/04883* (2013.01); *G06F 3/04886* (2013.01)

(58) Field of Classification Search
CPC .. G06F 3/042; G06F 3/04817; G06F 3/04883; G06F 3/04886
USPC .......................................................... 715/811
See application file for complete search history.

(56) References Cited

U.S. PATENT DOCUMENTS

| | | | |
|---|---|---|---|
| 8,823,667 B1 * | 9/2014 | Hill | G06F 3/0482 345/173 |
| 8,959,579 B2 * | 2/2015 | Barton | G06F 21/6218 726/1 |
| 9,111,105 B2 * | 8/2015 | Barton | H04L 41/00 |
| 9,191,832 B2 * | 11/2015 | Marti | H04W 4/33 |
| 9,529,996 B2 * | 12/2016 | Qureshi | H04L 9/0891 |

(Continued)

*Primary Examiner* — David Phantana-angkool
(74) *Attorney, Agent, or Firm* — Pierce Atwood LLP

(57) ABSTRACT

Users can switch between applications using contextual interface elements. These elements can include icons for applications determined to likely be accessed by the user for a current context. Information is gathered to determine the current context, then information such as patterns of historical usage are utilized to determine and rank the applications by likelihood of use. Different contexts can include different icons, and a given context can include different icons for different points in time or locations. A user can access a contextual interface element by performing a swipe motion, for example. The user can continue the motion to an area associated with an icon of interest, and perform an action such as a tap or release to cause the associated application to be launched. Such an approach enables a user to quickly and easily launch another application independent of the application currently active on the device.

20 Claims, 10 Drawing Sheets

(56) References Cited

U.S. PATENT DOCUMENTS

| | | | |
|---|---|---|---|
| 9,576,443 B2* | 2/2017 | Shirriff | G08B 5/22 |
| 9,602,950 B1* | 3/2017 | Gonzalez | H04W 4/18 |
| 9,606,774 B2* | 3/2017 | Walker | G06F 8/65 |
| 9,626,365 B2* | 4/2017 | Grossman | G06K 9/6218 |
| 9,654,508 B2* | 5/2017 | Barton | G06F 9/45533 |
| 9,686,648 B2* | 6/2017 | Leppanen | H04L 67/16 |
| 9,706,518 B2* | 7/2017 | Ball | H04W 4/021 |
| 10,331,308 B2* | 6/2019 | Krishna | G06F 21/88 |
| 2012/0042036 A1* | 2/2012 | Lau | H04W 4/60 709/217 |
| 2012/0278179 A1* | 11/2012 | Campbell | G06Q 30/0255 705/14.69 |
| 2012/0278331 A1* | 11/2012 | Campbell | H04N 21/44204 707/740 |
| 2012/0331137 A1* | 12/2012 | Olsen | G06Q 30/02 709/224 |
| 2013/0024371 A1* | 1/2013 | Hariramani | G06Q 20/36 705/41 |
| 2014/0189572 A1* | 7/2014 | Martens | G06F 3/04817 715/780 |
| 2014/0195972 A1* | 7/2014 | Lee | G06F 3/04817 715/811 |
| 2014/0201655 A1* | 7/2014 | Mahaffey | G06F 3/04817 715/765 |
| 2015/0378545 A1* | 12/2015 | Telang | G06F 3/0485 715/822 |
| 2016/0259528 A1* | 9/2016 | Foss | G06F 3/04817 |
| 2019/0065975 A1* | 2/2019 | White | G06F 7/08 |

\* cited by examiner

CONTEXTUAL LAUNCH INTERFACES

CROSS-REFERENCE TO RELATED APPLICATION

This application is a continuation of, and claims the benefit of priority of, U.S. Non-Provisional patent application Ser. No. 14/488,001, filed on Sep. 16, 2014, and entitled "CONTEXTUAL LAUNCH INTERFACES," scheduled to issue on Apr. 16, 2019, as U.S. Pat. No. 10,261,672, the contents of which is expressly incorporated herein by reference in its entirety.

BACKGROUND

People are utilizing computing devices for an ever-increasing variety of tasks. Accordingly, there is an ever-increasing amount of applications and functionality through which a user must navigate in order to perform a given function. Since conventional menus and icon layouts are static, a user must exit a current application or task and navigate to the appropriate menu or layout location in order to activate a particular application or function. This can be inconvenient at best, and further can make it difficult to return to the task which the user was previously performing with the device. While users have some ability to customize these layouts, the layouts do not adapt for changes that might cause a user to tend to use some applications more than others. Thus, a user must attempt to manually organize things in a way that balances all potential situations and uses, which thus causes inefficiencies for each of these uses.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to accessing and/or causing computing tasks to be performed. In particular, various embodiments of the present disclosure determine applications (or functionality) that are most likely to be of interest to, or accessed by, the user based on a current context, and provide contextual interface overlays that enable the user to quickly launch or otherwise access any of those applications using a simple gesture or motion. The overlays can take the form of globally accessible panes that include icons for the applications that are determined to most likely be accessed by the user for the current context.

Figure 1:
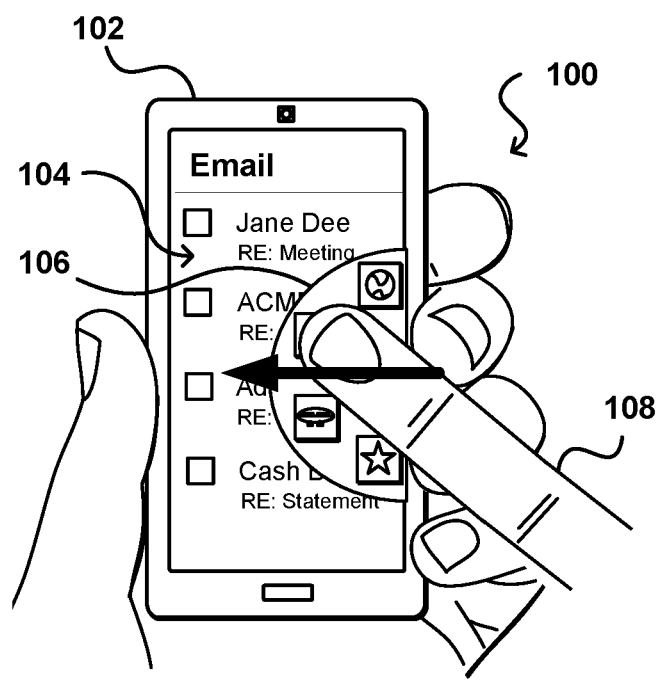
FIG. 1 illustrates an example contextual interface overlay that can be utilized in accordance with various embodiments.
Figure 2A:
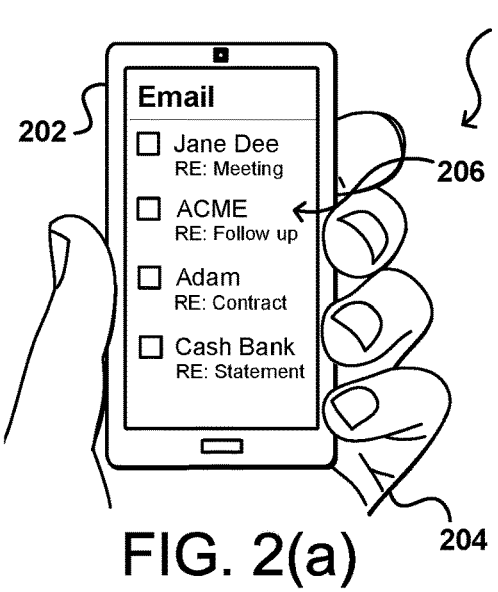
FIGS. 2(a), 2(b), 2(c), 2(d), and 2(e) illustrates a conventional process for activating an application of interest.
Figure 2B:
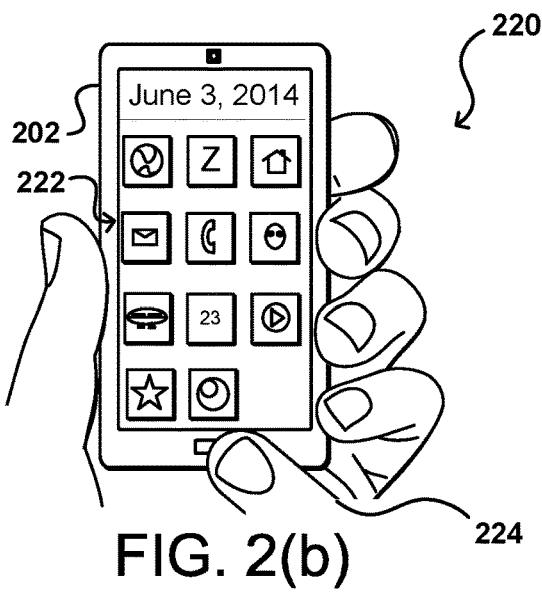
Figure 2C:
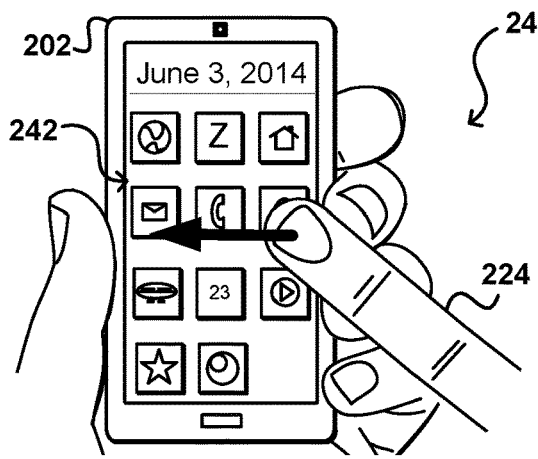
Figure 2D:
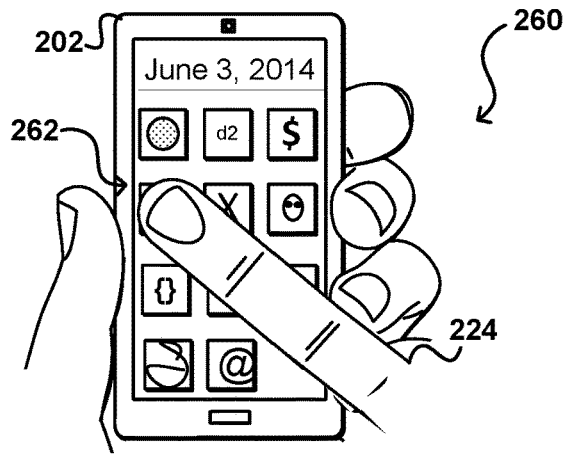
Figure 2E:
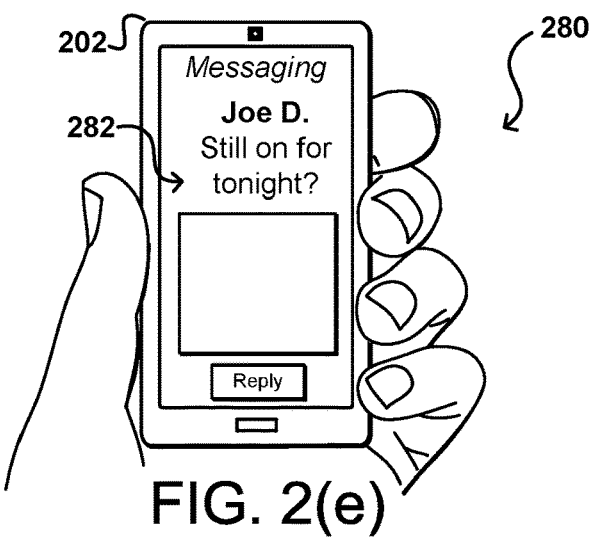
Figure 3A:
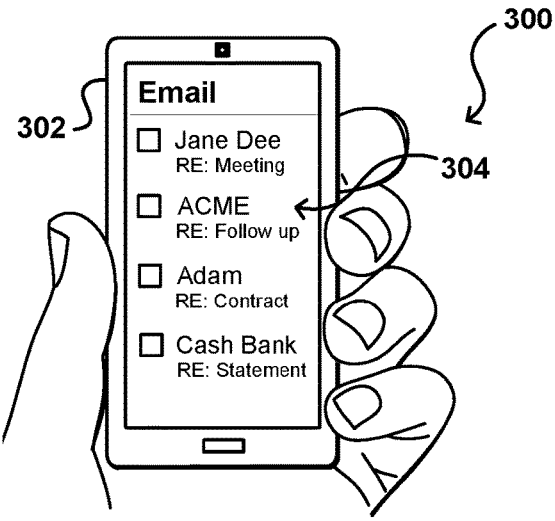
FIGS. 3(a), 3(b), 3(c), and 3(d) illustrate an example process for activating an application of interest that can be utilized in accordance with various embodiments.
Figure 3B:
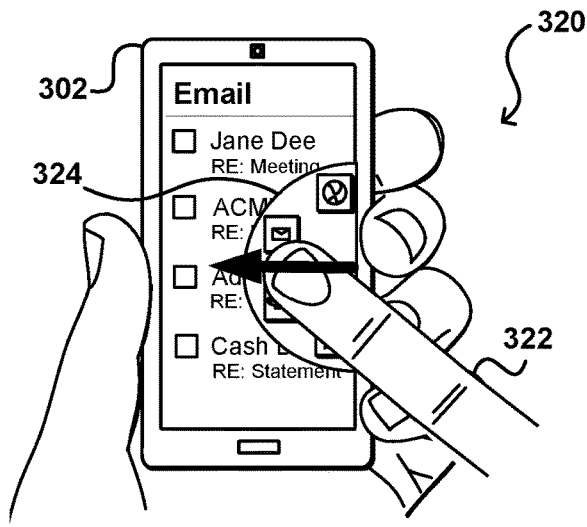
Figure 3C:
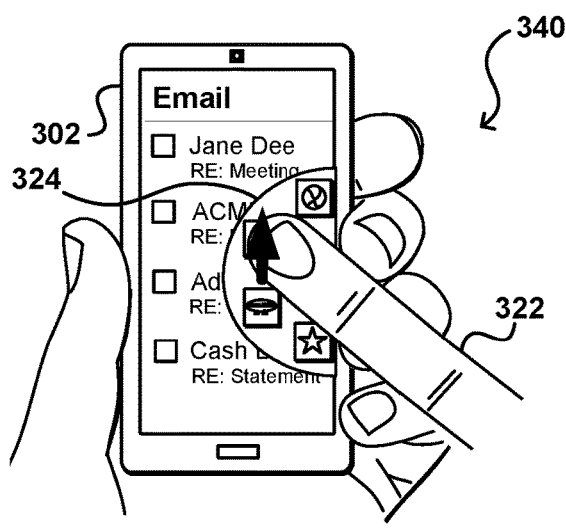
Figure 3D:
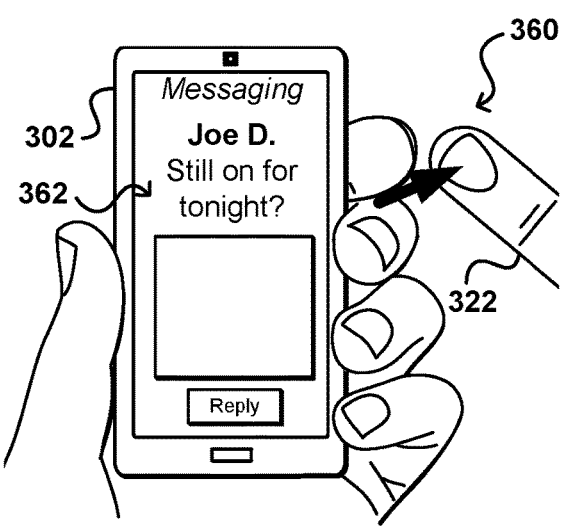

FIG. 1 illustrates an example situation 100 wherein a user is able to access a contextual interface overlay in accordance with various embodiments. In this example, the user is holding a computing device 102, in this example a smart phone, in the user's left hand. An email application 104 is currently active on the computing device 102. If the user wants to switch to a different application, the user can use a finger 108 or other such object to make a motion from near an edge of a display on the device to cause the contextual interface overlay 106 to be displayed. The contextual interface overlay includes icons for a number of different applications, the selection of which can be determined based upon a current context. The current context can be determined based upon information determinable for the device and/or user. This information can include, for example, the identity of the user, the time of day, and the geographic location of the device. Based on such information and past user behavior or usage patterns, a determination can be made regarding the applications that are most likely to be accessed by the user in the current context. Icons for these applications then can be displayed, such that the user can move his or her finger towards the appropriate icon and then release or otherwise move the finger away from the contextual overlay, in order to cause the corresponding application to be launched, selected, or otherwise brought into focus on the computing device. Such an approach enables the user to activate an application of interest using a single motion and without having to first exit the active application and navigate to the application of interest. The icons displayed are dynamically determined, and can change with variations in context.

Other variations, functions, and advantages are described and suggested below as may be provided in accordance with the various embodiments.

As mentioned, conventional approaches to switching applications or accessing functionality can be cumbersome and non-intuitive. For example, FIGS. 2(a) through 2(e) illustrate a conventional process that a user must use to switch applications using a computing device. In this example, the user is holding a computing device 202 in one hand 204. The computing device is executing an email application 206, an interface of which is displayed on a display of the device. As known for such devices, the user can provide input to the application through various mechanisms, such as a touch-sensitive display.

For many such devices, the user must first exit the current application in order to access another application. For example, as illustrated in the situation 220 of FIG. 2(b), the user has used a finger 224 to press a home button, or similar option, which causes the email application to no longer be active, or at least in focus, on the computing device 202, instead causing a home screen 222 or similar interface to be displayed. As illustrated, the home screen includes icons for several different applications, and the user can have some flexibility in at least some systems to move, select, or rearrange the icons that appear on that particular screen.

In many cases, the icon for the application in which the user is interested is not placed on the first home screen that is displayed to the user. In this case, the user may need to provide additional navigational input, such as to swipe a finger 224 across the screen in order to cause a different screen of icons 242 to be displayed, as illustrated in the example situation 240 of FIG. 2(c). In some cases a user must navigate through several screens of icons in order to locate the icon of interest. Once located, the user must perform another action, such as to select the icon 262 using a finger 224 or other such object, as illustrated in the example situation 260 of FIG. 2(d). Once the icon is selected, the application can be launched, switched to, or brought into focus, among other such options, such that an interface 282 for the application is displayed and available to the user, as illustrated in the situation 280 of FIG. 2(e).

Such an approach has several drawbacks. For example, the user must exit out of the current application in order to search for the appropriate icon. Further, the user must navigate through multiple screens to locate the icon. These tasks, along with the actual selection of the icon, result in several actions needing to be performed by the user, which can be inefficient and somewhat frustrating to the user. Certain devices allow for some amount of back switching between applications without first exiting to a home screen, for example, but these approaches only enable the user to navigate between applications that the user has launched and that are currently executing or otherwise active on the device. There is no way for a user to quickly launch an application, particularly one that is relevant to a current context.

Systems and methods in accordance with various embodiments overcome these and other deficiencies by providing contextual interface overlays that provide for quick access to applications that are likely to be accessed by a user. These embodiments also utilize logic and algorithms to dynamically determine which applications are most likely to be accessed by the user at a particular point in time, such as for a determined context, such that the selection of icons to be displayed can be different for different contexts. By dynamically updating the selection, the interface overlay can provide the application icons that are most likely to be of use to a particular user, or type of user, for any time, location, or situation, etc.

FIGS. 3(a) through 3(d) illustrate an example process for providing and/or utilizing such a contextual interface overlay in accordance with various embodiments. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, wearable computers (e.g., smart watches and glasses), portable media players, and digital cameras, among others. In the example situation 300 of FIG. 3(a), a user is holding a computing device 302 that has an interface 304 for an email application active on the device. If the user wants to switch to a different application, the user can use a finger 322, or other such object, to "swipe" in from near an edge of the touch-sensitive display of the device 302, as illustrated in the example situation 320 of FIG. 3(b). It should be understood that other types of input can be used as well, such as by swiping in a similar direction but at a distance from the screen, as may be picked up by gesture or motion sensors, among other such options. Motions other than a lateral swipe in a direction substantially parallel to a plane of the display can be used as well in various embodiments. The swipe motion, upon detection by the device, can cause a contextual interface overlay 324 to be displayed on the display, overlying the interface of the email application. The overlay in some embodiments can be animated to appear to move in from the edge of the screen along with the swiping motion of the finger 322. As illustrated, the overlay 324 has a selection of icons displayed thereon, although other user-selectable elements may be displayed as well in accordance with various embodiments. As mentioned, the selection of icons can be dynamically determined based on context information, as discussed elsewhere herein. If the icon for the application to which to user wants to switch is displayed, the user can move his or her finger 322 in the direction of the icon, as illustrated in the example situation 340 of FIG. 3(c). Once the finger is in a location associated with the desired icon, such as by being positioned over a set of pixels of the display screen that are used to display the icon, the finger 322 can be removed from the display or pulled away from the icon as illustrated in the example situation 360 of FIG. 3(d), which can cause the desired application interface 362 to be launched, executed, switched to, or otherwise brought into focus on the computing device. Such an approach can be desirable for a user, as the user can quickly switch to a desired application, and the selection of applications can adapt as needed to cause the most relevant applications to be displayed at any time. Further, the approach enables selection of the appropriate icon through a single touch or motion of the finger to the device in at least some embodiments, as the finger swipes in to display the overlay, across to the area associated with the icon of interest, and then up to launch. Such an approach can be particularly useful for portable devices such as smartphones or wearable computers, where there may be limited real estate on the display and the user may prefer to interact with the device using a single finger or thumb, for example.

In order to determine which applications or functionality may be of interest to a user for a particular context, various embodiments enable a computing device collect information in order to attempt to determine usage patterns attributable to a particular user. In some embodiments, the device can observe and analyze usage data associated with the device, in order to learn to recognize patterns in how the device is used (e.g., how the device operates). The usage data can include current usage data and/or previous (i.e., historical) usage data. In some cases, the user can develop one or more habits or routines in life, such as an hourly routine, a daily routine, a weekly routine, a monthly routine, an annual routine, etc. In one example, the user checks email using the device at approximately 8:07 AM almost every weekday. In another example, nearly every weekday morning for the past month at approximately 8:22 AM, the user gets into his car and opens the map/navigation application to help the user determine the quickest route to work. Based on the user's habits, routines, times that applications were launched or exited, and/or other usage data associated with the computing device, the device (or a system or service in communication with the device) can learn to recognize patterns and/or recurring events related to how it is used or operated (i.e., usage patterns). When attempting pattern recognition, a device (or system or service in communication with the device) can attempt to determine information such as the identity or type of user using the device (e.g., mom, dad, or child), the type of location (e.g., work, school, or home), whether the user is commuting, whether the user is left or right handed, whether the user is male or female, etc. This information can be pushed up the stack and presented to an application via a simple API that provides answers to at least some of those very simple questions.

In some embodiments, having recognized or determined usage patterns associated with how the device is used and/or how it operates, the device can attempt to determine (i.e., identify, predict, etc.) a task(s) that is likely to be performed using the computing device at a specified time. In some cases, the device can calculate a likelihood (e.g., a confidence score indicating) of whether or not the task(s) will be performed using the device within a specified time period (e.g., within the next five minutes, within the next day, within the next decade, etc.). The potential task(s) that is determined can be a task that has a likelihood, above a specified threshold, of being performed at the device within the specified time period (e.g., in the near-future).

Referring to the previous examples, the device can determine, with sufficient, minimum, or satisfactory confidence, that the user is likely to check email today (e.g., a weekday) at approximately 8:07 AM. Further, the device can determine that the user will likely open the map/navigation application at approximately 8:22 AM to figure out the quickest way to get to his work. Based on determining (i.e., identifying, predicting, etc.) which tasks are likely to be performed at the device at or near the specified time, the device can provide recommendations and/or other relevant information associated with those tasks that are likely to be performed (e.g., initiated by the user) at or near the specified time. As mentioned, these recommendations can be used to determine which application icons, or other such user-selectable elements, are displayed to a user at a particular time using one or more contextual interface overlays.

Continuing with the previous examples, at 8:00 AM, the device can make the icon for the email application easier to access for the user by placing the icon appropriately on a specified overlay. Moreover, the device can begin to check for and/or download new emails. As such, the user can more easily access email and can finish the email checking task more quickly and efficiently. Then at 8:15 AM, for example, the device can place the navigation application icon appropriately such that the user can determine to take Highway 101 North to get to work, rather than Highway 909 North. In some embodiments, the providing of the recommendations and/or other information can be performed dynamically and/or in real-time, such that a change in the situation can be handled quickly.

In at least some embodiments, a computing device can track, record, observe, and/or otherwise obtain usage data associated with the device. For example, a device can recognize a weekday morning routine for a user of the device. The user may, on most weekdays, tend to call a spouse at approximately 9:00 AM while driving to work. In the past two months, at approximately 9:10 AM, the user tends to call the user's boss to report in. At approximately 9:20 AM, for the past three weeks, the user has called Jane's Coffee shop to order and pick up coffee. When the user arrives at work, for the past week, he tends to send a text message to a co-worker, Johnny. Then, for the last three days, the user has been dialing in to a conference bridge number to attend a teleconference meeting at 10:00 AM. These actions initiated and/or performed by the user using the device can be observed or otherwise tracked as usage data of the device. Thus, the device can not only learn the patterns of the user with respect to various applications, but also patterns of usage with respect to that application. Thus, when the user is able to select the phone app from the contextual interface overlay, the phone app might be configured to be ready to dial the number that the user is most likely to dial based on the current context, such as day of the week and location, etc. Further, based on the obtained usage data, the device can identify a usage pattern which indicates that the user is likely to call the user's spouse today at approximate 9:00 AM. As such, the device can provide an icon for a contacts application that may be set to show information for the user's spouse at the top of a recommended contacts list, at or prior to 9:00 AM. Also, in some embodiments the device can retrieve information from the web (e.g., a local business and restaurant guide website), and provide the retrieved information to the user. For example, an address for a number to be dialed can be promoted through an address or navigation application. In a similar fashion, since the user tends to text message Johnny, the device can promote a messaging application, and can configure Johnny's phone number and email address (e.g., retrieved from the device's contacts feature or app) to be available in case the user wants to call or email Johnny instead. Moreover, based on the obtained usage data (e.g., including data from a calendar/events feature or app of the device), the device can recognize that the user will likely attend a teleconference at 10:00 AM and promote a calendaring application or phone application, using the relevant conference and bridge information.

Accordingly, the icon for a contacts application can be promoted such that the user can utilize the recommended contacts feature to find or navigate to likely relevant contact data. This can reduce the need for the user to manually search through applications as well as call logs or contacts in order to find and utilize the relevant information. Also, in at least some embodiments, the recommended contacts feature can be dynamic, such that an order or selection of the recommended contact list can change throughout the day and/or due to changes in the user's situation or context. For example, after 9:05 AM and/or after the device has determined that the user has already called the user's spouse, the contact information for the user's spouse can be removed from the recommended contacts list, and the rest of the contact information can be moved up the list and new contact data added. In another example, if the calendar feature/app shows that the teleconference was cancelled, the information for the teleconference can be removed as well, and application icons that might be used to perform a task with respect to that teleconference can be removed from the contextual overlays unless needed for another such purpose.

In at least some embodiments, relevant information can be determined based at least in part upon usage data. A user of a computing device can host a weekly "movie night" in which the user invites friends over to hang out, eat, and watch a movie. Accordingly, the example scenario can involve, among other things, the user, one or more friends of the user, food (e.g., delivered pizza, take-out food, etc.), a device for watching the movie (e.g., a television), and movie content, among other such things. The user may have hosted the movie night on nearly every Friday night for the past year. In this example, the device can obtain device usage data including (but not limited to) how the device is used to make communications (e.g., phone calls, text messages, emails, etc.) among the user and the various friends, how the device is used to order food, and how accessing a web service to obtain movie-related information is performed using the device. Based at least in part on this data, various usage patterns can be determined. For example, it can be recognized that, on a typical Friday night, the user calls John, Dave, and Jane at approximately 7:00 PM, orders food from "Pizza Place" at approximately 7:30 PM, and accesses web information about movies at approximately 8:00 PM. Accordingly, applications can be prioritized at or near each of these times that enables the user to easily perform these actions. Further, the state or options presented to the user for those applications may also be determined based at least in part upon this data.

In some embodiments, based on the identified/recognized usage patterns one or more tasks can be determined that have at least a sufficient, minimum, or satisfactory likelihood of being performed at the device (e.g., initiated by the user). Thus, the device can provide access to relevant applications, information, and/or functionality, including suggestions or recommendations, at or prior to a time when the information may be useful. The device can provide access to the phone application and/or to contact information for John, Dave, and Jane, at or prior to 7:00 PM (when the user typically contacts John, Dave, and Jane). Likewise, at or prior to 7:30 PM, the device can provide quick access to a reservation or ordering application and provide access to information about a restaurant that the user typically orders from. In addition, at or prior to 8:00 PM, the device can provide quick access to a movie application to provide easy access to movie information, or can alternatively provide an icon to launch a browser window directed to a website that the user frequents to order movies or other media. This and other relevant information provided can improve the efficiency and/or ease of access associated with performing the user's tasks.

At least some embodiments provide and/or utilize and intelligent recommendation engine to determine applications, tasks, settings, functionality, or other aspects that can be provided and/or recommended for quick access by a user. Going beyond monitoring past usage, as discussed above, an intelligent recommendation engine can analyze any relevant and/or appropriate information to determine which application icons, for example, to surface to a user. This can include information available to the user device, a backend system, a third party service, and the like, and can come from any appropriate source. This information can include, for example, purchase or viewing history information relating to products viewed, purchased, rented, or otherwise accessed from one or more sites or sources, whether accessed via the current device or otherwise. Information can also include information from message or email mining, for example, such as where a recently received email message including a boarding pass and boarding information can cause an airline or airport application to be surfaced. Information from a calendar or task list can be used to surface documents relevant to a meeting, an application relevant to performing the task, and so on. The user can use available network or location information to determine that the user is in a movie theater complex and surface an option to adjust the volume or enter airplane mode, among other such options. A combination of connection, location, calendar, and mining information, for example, can be used to determine that the user is at the airport waiting on a plane, and can surface an application to play recently downloaded movies, or can surface icons for one or more of those movies to enable the user to play one of them directly. Alternatively, the recommendation engine can surface an icon for a media library, which the user can open to select a downloaded moving to play. Various other types of information and recommendations can be utilized and/or provided as well in other embodiments. The applications or other elements surfaced to a user might be already be on or accessed by the user, or might correspond to applications or elements of which the user might not be aware but might be interested in utilizing based on the current context, etc.

An intelligent recommendation service can also utilize information that may not be specific to the user but might be relevant to the user. For example, if there is an accident on a route the user is taking (or about to take) the engine can recommend a navigation or traffic application to enable the user to select another route. If the user is about to leave for an event but there is bad weather forecast, the engine might recommend a weather application. If there is late breaking news that is likely to be relevant to the user, the engine might recommend a news application or even an icon for a specific article. If a user's car needs servicing, as may be determined by communicating with the vehicle, the engine might recommend a dealer service application, etc. Each of these approaches would be treated like other relevant applications in at least some embodiments, with each suggestion being ranked, scored, or otherwise analyzed to determine a number of icons or graphics to surface to the user, such as icons for the five to ten most highly ranked or scored applications. Different types or levels of information can be weighted differently, as may be predetermined or determined in response to user preferences or activity. For example, the user might often check the weather but may not care about the traffic, such as where the user uses a bike for transportation, etc.

For any or all of these applications, settings, tasks, etc., there can be contextually relevant information or content that can be at least partially preloaded in response to surfacing a respective icon. For example, if a mapping application icon is surfaced, the device could attempt to download mapping data for the nearby region, such that if the user launches the application there will be little to no delay in displaying the map data. Similarly, if an application for a news application is recommended, at least some of the current news content can be loaded in the background in order to enable the user to quickly access the content. Any content or data that would otherwise need to be downloaded, updated, or acquired in response to launch or focus of an application can be at least partially preloaded in the background in at least some embodiments. In at least some embodiments, the order in which the data is preloaded can correspond to the respective ranking or scoring of the corresponding applications, for example, such that the data for the most likely application to be accessed is loaded, or at least the download started, before the other applications to be recommended.

In some embodiments, the orientation of the device and/or the way in which the user is holding the device can be used to determine which applications to recommend. For example, a user might always watch movies in landscape mode, with the longer dimension of the display screen being predominantly horizontal, but might always text with the screen in portrait mode, with the longer dimension being predominantly vertical. The display mode of the device can be used as well, such as where the device is flat on a table but the user has put the device in a certain orientation, which can be determined through user head tracking, finger touch shape processing, and the like. If the device is determined to be in landscape mode, certain applications such as movie players and gaming applications might be ranked higher than applications such as clock or messaging applications if the user typically uses the clock and messaging applications in portrait mode. Other information can be used as well, such as whether the device is in motion (such as in a vehicle), being held by a user (as may be determined through small variations in position or orientation), connected to a wireless data network, and the like. Any appropriate information that can help to determine the most likely applications to be accessed can be utilized in accordance with various embodiments.

As mentioned, the dynamically-determined relevant information that is provided to the user can change dynamically and/or in real-time. For example, if the device detects (e.g., using information retrieved from a web resource, such as a local restaurant review website) that Pizza Place is closed for some reason, then the device can provide access to applications, pages, or data for other similar restaurants and/or other restaurants from which the user has previously ordered. In another example, if an electronic message is received from Jane at 6:40 PM indicating that she cannot attend the movie night, then Jane's contact information need not be provided and/or the phone application need not be prioritized to assist the user in contacting Jane. In a further example, if it is determined that the user tends to post a status update on a social networking application an hour into the movie, the device prioritize the application icon to assist the user in obtaining easier access to social network at or prior to that time. In another example, if the device determines, based on device geolocation (e.g., GPS) data, that it is not at or near the user's home address on a Friday night, then the device can decide not to provide this information or prioritize these applications, even though based on other data such as time of day and day of the week they might seem relevant. The device can determine other relevant information to provide instead based on the available contextual data.

Moreover, various embodiments can enable communications among multiple devices. In one example, the user may have been using a first device throughout the day to browse the web, and may have spent a lot of time viewing information about "Movie XYZ." Additionally or alternatively, the user could have used that device to communicate electronically with friends throughout the day and they could have agreed to watch Movie XYZ. These and other pieces of usage data can be observed, obtained, and analyzed by the first device (or systems or software in communication with the first device). The first device can determine that data related to Movie XYZ is likely relevant for tonight. In some cases, a second device can perform one or more actions using the relevant information (e.g., the data related to Movie XYZ). For example, the second device can communicate to the first device to cause the first device to prioritize a media player application and begin loading the contents of Movie XYZ prior to when the user typically watches movies (e.g., preload at least a portion of Movie XYZ prior to 8:00 PM). This can reduce lag and/or buffering time associated with playback of the movie (and/or other media content). Also, the preloading can increase a quality (e.g., image quality, resolution, bit rate, audio quality, etc.) associated with playback of the movie. Furthermore, in some embodiments, the movie (and/or other media content) can be preloaded on the second device.

In some embodiments, whether the user actually accessed and/or used the provided relevant information can be taken into consideration. For example, if the user no longer used the provided contact information for Jane for the last three movie nights, the device can learn from this pattern and can utilize it as input or feedback, such that perhaps next time, the device need not provide Jane's contact information or prioritize the relevant application(s).

In another example where relevant information can be determined dynamically based on contextual data, an example device can utilize one or more geolocation sensors on the device to obtain geolocation information associated with the device. An example device can include various sensors for determining things such as geolocation, altitude, speed, motion, and the like, as may include one or more or a GPS sensor, a sensor for radio signal multi-lateration, an electronic gyroscope, an inertial sensor, an electronic compass, an altimeter, a barometer, and the like. A device might also analyze audio and/or video data in the environment around the device to determine data such as location, type of location, nearby people, and the like.

In one example, the user of a computing device frequently meets with his best friend Dave at Joe's Grille on Saturday evenings. The user can be utilizing a map application (i.e., app) to get to Joe's Grille. The mapping and/or navigation app(s) can indicate that the user's current representative geolocation has arrived at the desired destination (e.g., Joe's Grille). The device can recognize that the user frequently meets Dave at Joe's Grille on Saturday evenings (at or near 5:00 PM). As such, at or prior to Saturday 5:00 PM and/or upon recognizing that the user (e.g., the user's device) is at or near Joe's Grille, the device can provide relevant information to the user, such as by prioritizing the appropriate application icon or sending a notification. The notification can ask the user whether he would like to contact Dave, and if so can prioritize the icons for the relevant application(s). The user can interact with (e.g., click on, tap on, etc.) the notification and/or icon to cause a communication application (e.g., messaging application) to be provided to the user. The type or selection of application can be based at least in part upon the applications that the user historically uses for such purposes in such contexts.

In some embodiments, a device can analyze usage data including communication data (e.g., data associated with phone calls, data associated with call logs, data associated electronic messages such as text message or emails, etc.). In one example, most of the time when the user arrives at Joe's Grille to meet Dave, the user will send a text message to Dave stating "Hey Dave, I'm at Joe's Grille. I'll meet you inside." The device can recognize that the user frequently and recurrently sends this (or another similar) message when the user arrives. Thus, the icon for the communication application can be prioritized at the appropriate time, and when the communication application is provided to the user, the device can generate (e.g., preload) message content that reads "Hey Dave, I'm at Joe's Grille. I'll meet you inside," which the user can then choose to send. In some embodiments, this might be an option that the user can select by swiping in a certain direction from the application icon, as discussed elsewhere herein. This can further reduce the time and effort required by the user if he was to type the message manually.

In some embodiments, if a device detects that the time is Saturday 5:15 PM, that the user has not yet arrived at Joe's Grille, and that the user is not on the way, then a notification can be provided to the user asking him whether he would like to contact Dave, and the icon for the appropriate application can be prioritized. If the user chooses to contact Dave, the message content can be generated by the device to state, for example, that the user cannot make it, or something similar. Alternatively, if the device detects that the user is still on the way, then the message content can be generated to say that the user is running late but still on the way, or something similar. Again, the icon can be prioritized and the option to send the message can be provided as a default option that is dynamically determined for the current context.

In addition, in some cases the device of the user can communicate with a computing device associated with Dave. If at least one of the devices determine that its respective geolocation is substantially close in proximity to that of the other (but not close to Joe's Grille), then the device can recommend another restaurant that is nearby, and can potentially prioritize the icon for a reservation and/or restaurant review application, among other such options.

As mentioned, the computing device can determine, based on contextual data and determined pattern or usage data, that the user is likely to open, initiate, run, or otherwise interact with a particular application(s) at or within a specified time(s). In one example, a device can recognize that on most Sunday afternoons (e.g., at approximately 2:00 PM), the user likes to access, use, play with, or otherwise interact with certain applications on the device (e.g., Remove Red-eye app, Vintage Effects app, Photo Crop app, HD Video app). As such, at least a portion of a user interface can be used to provide access to one or more of these applications that are likely to be relevant to the user at or within the specified time (e.g., access to one or more recommended applications can be provided at or prior to 2:00 PM on Sunday). The remaining portion can be used to provide any other appropriate information, such as would normally be displayed to the user. In some cases, an entire home screen page or other interface can be used to provide access to (e.g., used to display icons representing) the one or more relevant applications (e.g., recommended applications). Also, similar to previous discussions, the apps that are recommended and provided can change dynamically. In various embodiments discussed in here, however, the application icons that are prioritized can be accessed using one or more contextual interface overlays as discussed elsewhere herein.

In one process for providing relevant information based at least in part on usage data, historical usage data associated with a user of the computing system is obtained. Along with, or as part of, the historical usage data can be information such as location, time of day, day of week, and the like. The historical usage data can be analyzed and, based at least in part on the analysis of the historical usage data, one or more usage patterns associated with performing actions on the computing system can be recognized. The actions can be initiated by the user. The process can involve determining a computing task having a sufficient likelihood and/or confidence value (e.g., at least meeting or satisfying a threshold or criterion) of being initiated by the user to be performed at the computing system. In some cases, the computing task can be determined to have a sufficient likelihood of being initiated by the user to be performed at the computing system within a specified or determined time period. In some cases, the computing task can be determined based, at least in part, on the one or more usage patterns. Then the process can provide at least one recommendation associated with performing the computing task. In some instances, the at least one recommendation can be provided within the specified time period. The at least one recommendation can be useful for improving efficiency associated with performing the computing task. For example, the at least one recommendation can decrease an amount of user interactions required to perform the computing task. In other words, due to the at least one recommendation, less effort on the part of the user is need to perform the computing task.

In another example process, usage data associated with a user and/or computing device can again be obtained, with the usage data analyzed to determine one or more usage patterns associated with the computing device. Information can be determined that has at least a minimum likelihood of being relevant to a user of the computing device. In some instances, the information can be determined to be likely relevant to the user within a specified or determined period of time. In some cases, the information can be determined based, at least in part, on the one or more usage patterns. Access to the information that has the at least the minimum likelihood of being relevant to the user can then be provided, such as by prioritizing application launch icons that enable the user to access specified data and/or functionality. In some embodiments, access to the information can be provided within the specified period of time. In some instances, the information can be useful for improving an efficiency associated with performing a task of the user. The task can be performed using, at least in part, the computing device. In some cases, the task can be performed within the specified period of time.

In some embodiments, obtaining usage data can include accessing information indicative of how the user uses the computing device. For example, the information can include (but is not limited to) at least one of communication data, calendar data, clock data, geolocation data, orientation data, image data, mining data, environmental data, event data, seasonal data, occurrence data, user historical data, user preference data, user purchase history, audio data, web browsing data, network data, or application data. In some embodiments, access to the relevant information can be provided via at least one of a page interface (e.g., home screen page interface), a desktop interface, an operating system interface, a notification, a reminder, a calendar event, or an application interface, etc. Various embodiments can also enable third party application developers to utilize the present technology. For example, application programming interfaces (APIs) for the present technology can be implemented such that third party applications can utilize one or more features of the present technology. In some cases, the user of the device can choose whether or not to allow an app (e.g., third party app) to have access to the present technology. It is further contemplated that there can be many other uses and/or applications associated with the various embodiments of the present disclosure that a person having ordinary skill in the art would recognize.

Referring back to FIGS. 3(a) through 3(d), the icons selected for presentation on the contextual interface overlay 324 can be based on the usage patterns such as those determined from the examples given above. For example, when a user is to get together for movie night with friends, the icons might first have a messaging application, as the user tends to contact the friends at a certain time. A lower priority, or the highest priority after the contact, might be a restaurant application, as the user might order food after contacting the friends to find out what they want. The next highest priority, or highest priority after the food order, might be the movie application, as the user typically looks for movies that the user wants to watch that night. While the user might do some of these events out of order on certain nights, or might not contact certain friends certain nights, for example, the icons for these applications can be displayed on the contextual interface overlay 324 at the appropriate time so that the user can use his or her finger 322 to select the appropriate application with a single contact motion. As discussed, the placement or selection of these icons can differ by time, actions, or location, for example, and the priorities can change over time as user behavior changes, such as by inviting different friends or using different applications to rent movies, among others. It should be understood, however, that different approaches to causing a contextual interface overlay to be displayed can be used as well, and in some embodiments the overlays can be triggered by system level functionality that can be toggled on or off by a user, for example.

Figure 4A:
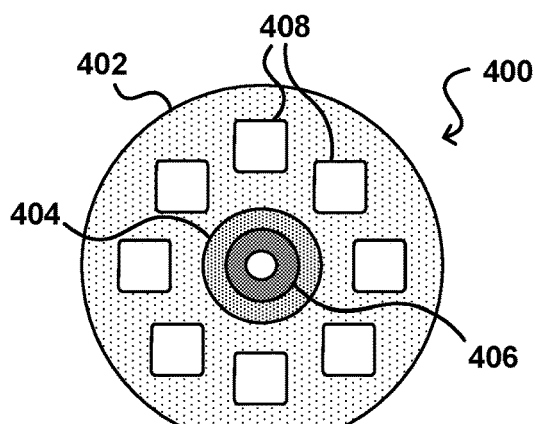
FIGS. 4(a), 4(b), and 4(c) illustrate example contextual interface overlays that can be utilized in accordance with various embodiments.

Also as mentioned, the interface overlay can include overlay portions for multiple different contexts, such as is illustrated in the example overlay 400 of FIG. 4(a). In this example, there are three context overlays 402, 404, 406, as may be useful for a work context, a home context, and a weekend context, among others. In this example, the first overlay 402 is displayed with an associated set of application icons 408. The first overlay might be selected based at least in part upon current contextual information. For example, the user device might be at a location associated with the user's place of business, and the time might be midday on a weekday. Accordingly, based on historical data the device can assume with relatively high confidence that the user is in a work context, and that application icons or other information associated with the work context should take priority. Thus, a work context might be displayed initially when a user accesses the contextual interface overlay 400. The icons associated with the work overlay can be related to the work context, which might relate to contacts, email, VPN, teleconferencing, and the like. The ordering, placement, and/or selection of the icons on the work overlay can be determined based at least in part upon the current context. For example, a user might always check email when first arriving in the office, and might always set up teleconferences for after lunch. Accordingly, these icons can be prioritized differently based on the time of day. Further, the user might only teleconference from his or her office but might check email anywhere, such that the icons can be placed differently based upon location in the business location as well.

Figure 4B:
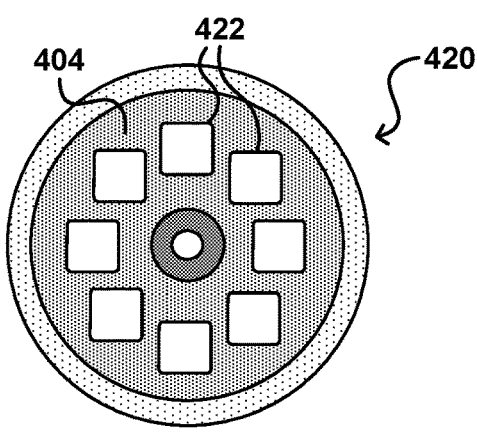
Figure 4C:
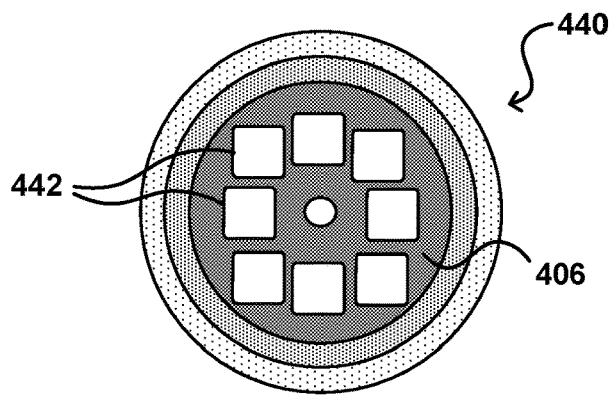

It might be the case, however, that the user is taking a break or wants to perform non-work related tasks while on a teleconference or in another such situation. Accordingly, the user might want to access applications that are more related to a different context, such as a home context. Similarly, the user might run home during the work day to wait for a service person, for example, and might prefer to be in a home context. If the location of the device is at home, a home context overlay 404 can be displayed primarily, as illustrated in the situation 420 of FIG. 4(b), or the user can swipe or otherwise provide input to cause the home overlay 404 to be displayed. The home overlay 404 can have a selection of icons 422 that might include a partially or completely different set of icons, in a similar or different ordering or placement than on the work overlay 402. For example, the email application icon might still be displayed, but a gaming icon and a movie viewing icon displayed instead of VPN or teleconferencing application icons. The selection can vary not only by the context overlay, but also the other factors such as location, time of day, day of the week, etc. Other overlays may be used and/or appropriate as well, such as a third overlay 406 illustrated in the example situation 440 of FIG. 4(c) to have yet another selection of icons 442, which might include fantasy football applications, grilling applications, or other icons that might be more relevant for a weekend context, for example. As mentioned, the overlay that is displayed "on top" can vary based upon current contextual information, and the user can have the ability to switch between overlays should the user want to operate within a different context. Various other options can be utilized as well within the scope of the various embodiments.

Figure 5A:
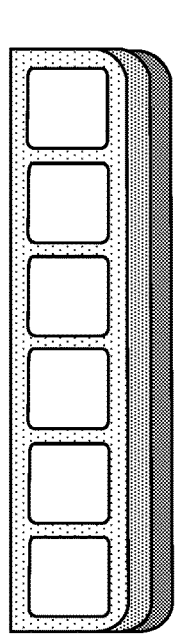
FIGS. 5(a), 5(b), and 5(c) illustrate example contextual interface overlays that can be utilized in accordance with various embodiments.
Figure 5B:
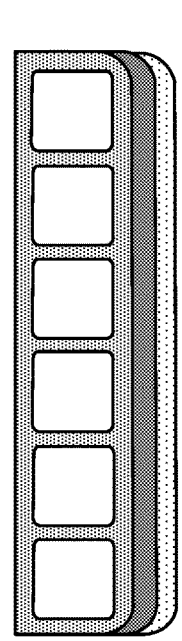
Figure 5C:
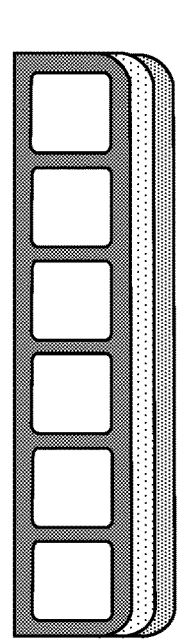

Although circular overlays are shown in many examples, other arrangements and overlay types are possible as well within the scope of the various embodiments. For example, FIGS. 5(a) through 5(c) illustrate a stacked or rectangular type of overlay that can be utilized in accordance with various embodiments. In the situation 500 of FIG. 5(a), a first overlay is displayed on top, corresponding to the most appropriate context based on currently available data. The situations 520, 540 of FIGS. 5(b) and 5(c), respectively, show states of the contextual interface overlay wherein different context overlays are prioritized, as may be due to different contextual information or user selection, among other such options. Various other forms and types of overlays or interface elements can be used as well, and the type of context and selection of icons can vary as well, as may be dynamically determined based on historical usage and other such data. In some embodiments historical information for a group of users can be used to determine the appropriate categories to use for the overlays.

Figure 6A:
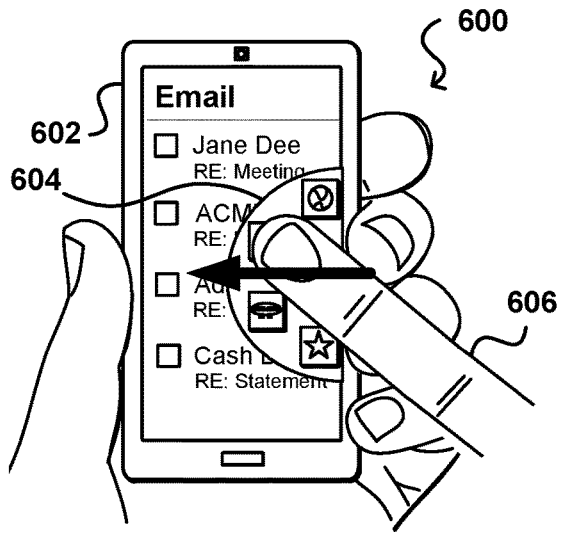
FIGS. 6(a), 6(b), 6(c), and 6(d) illustrate example ways in which a contextual interface overlay can be triggered in accordance with various embodiments.
Figure 6B:
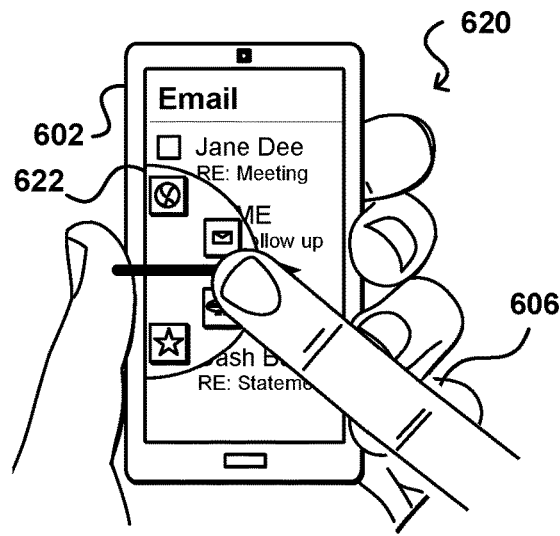
Figure 6C:
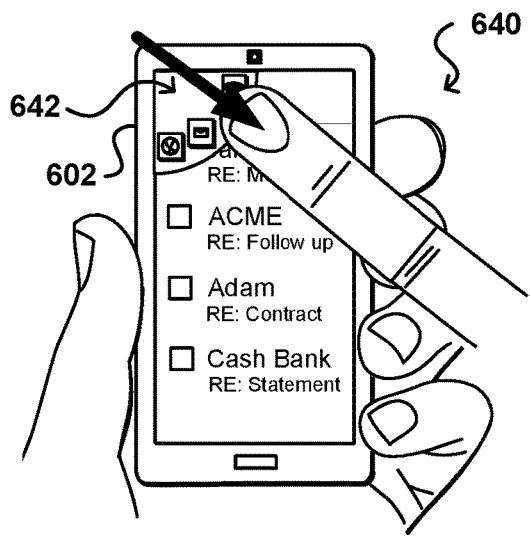
Figure 6D:
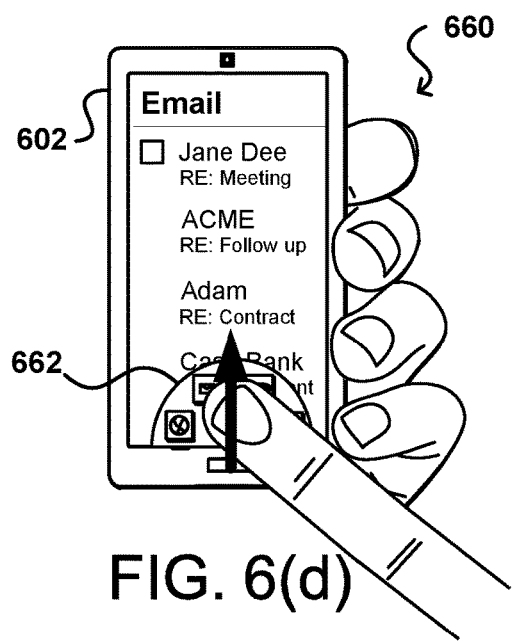

The overlays in at least some embodiments can be configured to appear, or be accessed, from various different directions and/or locations on the computing device. For example, FIGS. 6(a) through 6(d) illustrate situations 600, 620, 640, 660 wherein a user interacting with a computing device 602 can utilize a finger or other such object to access a contextual interface overlay from different locations. For example, in FIG. 6(a) the user swipes in an overlay 604 from the right edge of the display, while in FIG. 6(b) the user swipes in an overlay 622 from the left edge. In FIG. 6(c) the user swipes in an overlay 642 from a corner of the display, while in FIG. 6(d) the user swipes in an overlay 662 from the bottom of the display. It should be understood that terms such as "left," "right," and "bottom" are used for purposes of explanation and are not to be interpreted as requirements or necessary orientations unless otherwise specifically stated. Further, while swiping is used in these examples, there can be various other motions, gestures, and/or inputs to access these overlays as discussed elsewhere herein. Such access enables users to quickly access the desired application icons independent of whether the user is left handed or right handed, the device is in portrait or landscape orientation, the way in which the user holds the device or the size of the user's hands, etc. The flexibility further increases the usability and quick access of the contextual overlay elements.

Figure 7A:
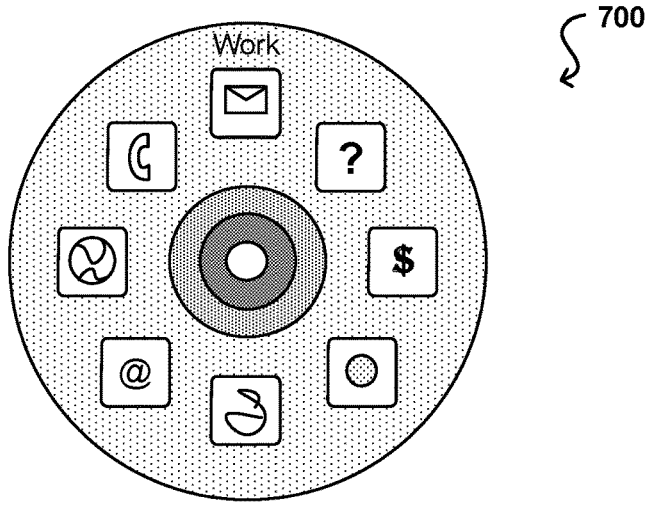
FIGS. 7(a), 7(b), and 7(c) illustrate example states of a contextual interface overlay that can be presented in accordance with various embodiments.
Figure 7B:
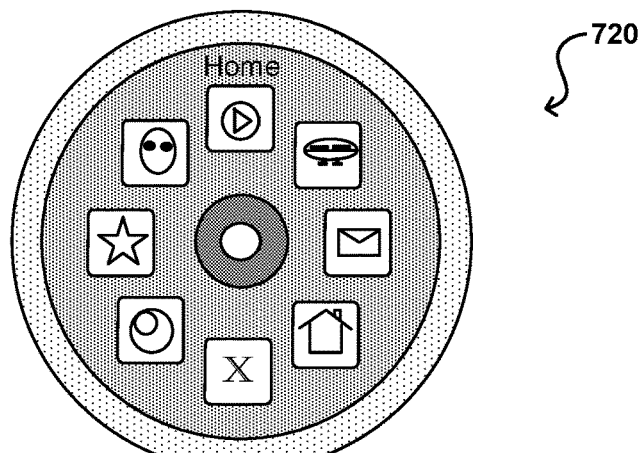
Figure 7C:
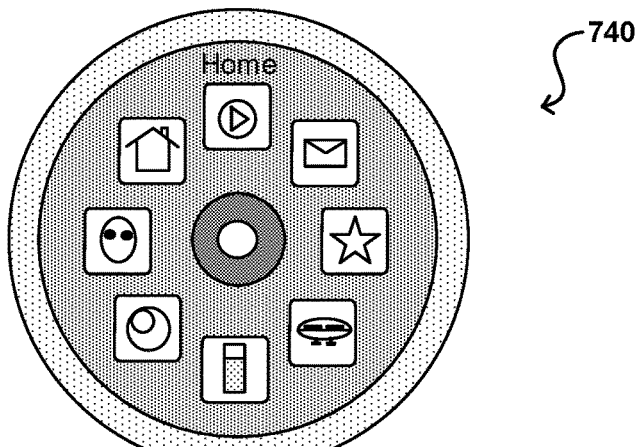

As mentioned previously, the selection of the contextual overlay and the selection of icons can both be dynamically determined based on contextual information available at a point in time. For example, the overlay 700 displayed in FIG. 7(a) includes a selection of icons that are relevant for a work context, while the overlay 720 displayed in FIG. 7(b) includes a selection of icons that are relevant for a home context. The overlay 740 of FIG. 7(c) illustrates a different selection of icons that are relevant for a home context. The difference in selection can be due to a number of different factors as discussed herein, such as different users, different times of day, different days of the week, different locations, different preceding sequences, and the like. The user can also have the option of changing which overlay is displayed, as well as potentially adding or removing icons for a given context in at least some embodiments. Each overlay also can have a different or specified color or pattern, in order to enable the user to more quickly determine the current context for which the device is suggesting applications. The different contexts can also correspond to any appropriate differentiation, such as morning versus evening, father versus mother, media versus productivity, etc. The contexts can be arranged by easily understandable categories that are selected based at least in part on the users' habits and/or aspects.

Figure 8A:
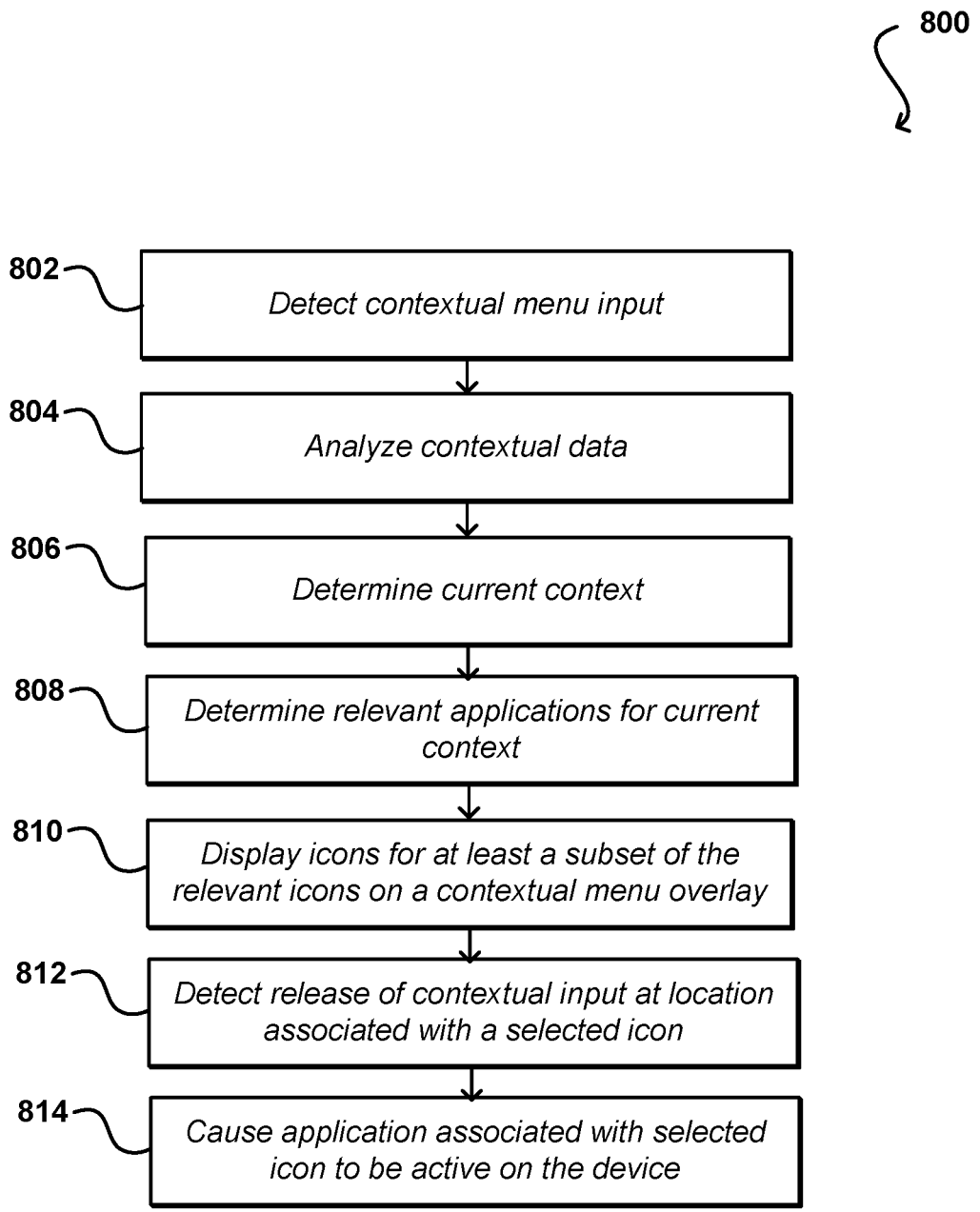
FIGS. 8(a) and 8(b) illustrates an example process for dynamically determining the state of a contextual interface overlay to be displayed in accordance with various embodiments.

FIG. 8(a) illustrates an example process 800 for providing one or more contextual interface overlays that can be utilized in accordance with various embodiments. It should be understood that for this and other processes discussed and suggested herein there can be additional, fewer, or alternative steps, performed in similar or different orders, or in parallel, within the scope of the various embodiments. In this example, contextual menu input is detected 802. Contextual menu input, as discussed above, can correspond to any input (e.g., motion, gesture, press, text, voice, etc.) from a user that causes a contextual interface overlay to be displayed on the device. This can include, for example, the detection of a finger of a user (or other object) being swiped in from proximate an edge of a display screen as discussed herein. In response to the input, available contextual data can be analyzed 804 to attempt to determine 806 a current context. As discussed, this can include determining location using a location sensor, determining time of day and day of week, determining user or user type, determining recent actions, and the like. In some embodiments the context can be determined and updated periodically such that the determination does not have to be performed in response to user input, in order to reduce latency and allow for prefetching or preloading of data as appropriate. As mentioned, in some embodiments more than one context might be determined based on the contextual data, with the contexts being prioritized as discussed elsewhere herein.

In response to a context being determined, a selection of relevant applications for the current context can be determined 808. As mentioned, even though a set of applications may be associated with a particular context, such as "work," the subset selected for display at any given time can be determined based upon current contextual values, such as location, time of day, day of week, user or user type, and the like. Once the subset is selected, the icons for at least the subset can be displayed 810 on a contextual interface element, such as a contextual interface overlay, that is displayed in response to the contextual menu input. A contextual interface element, or contextual element, can include elements other than overlays in at least some embodiments, as may cover contextual smart home screens, contextual pages or windows, contextual icon carousels or grids, and the like. While the contextual interface overlay is displayed, the release (or other action) of the contextual input can be detected 812 at a location associated with the icon of a specific application, for example. This can include, for example, a user moving the finger across the surface of a touch sensitive display to a portion of the display associated with pixels displaying a portion of the corresponding icon, and then removing the finger from the surface of the display. In response, the application associated with the selected icon can be caused 814 to be active on the device, such as by launching the application or bringing the application interface into focus on the device, among other such actions.

Figure 8B:
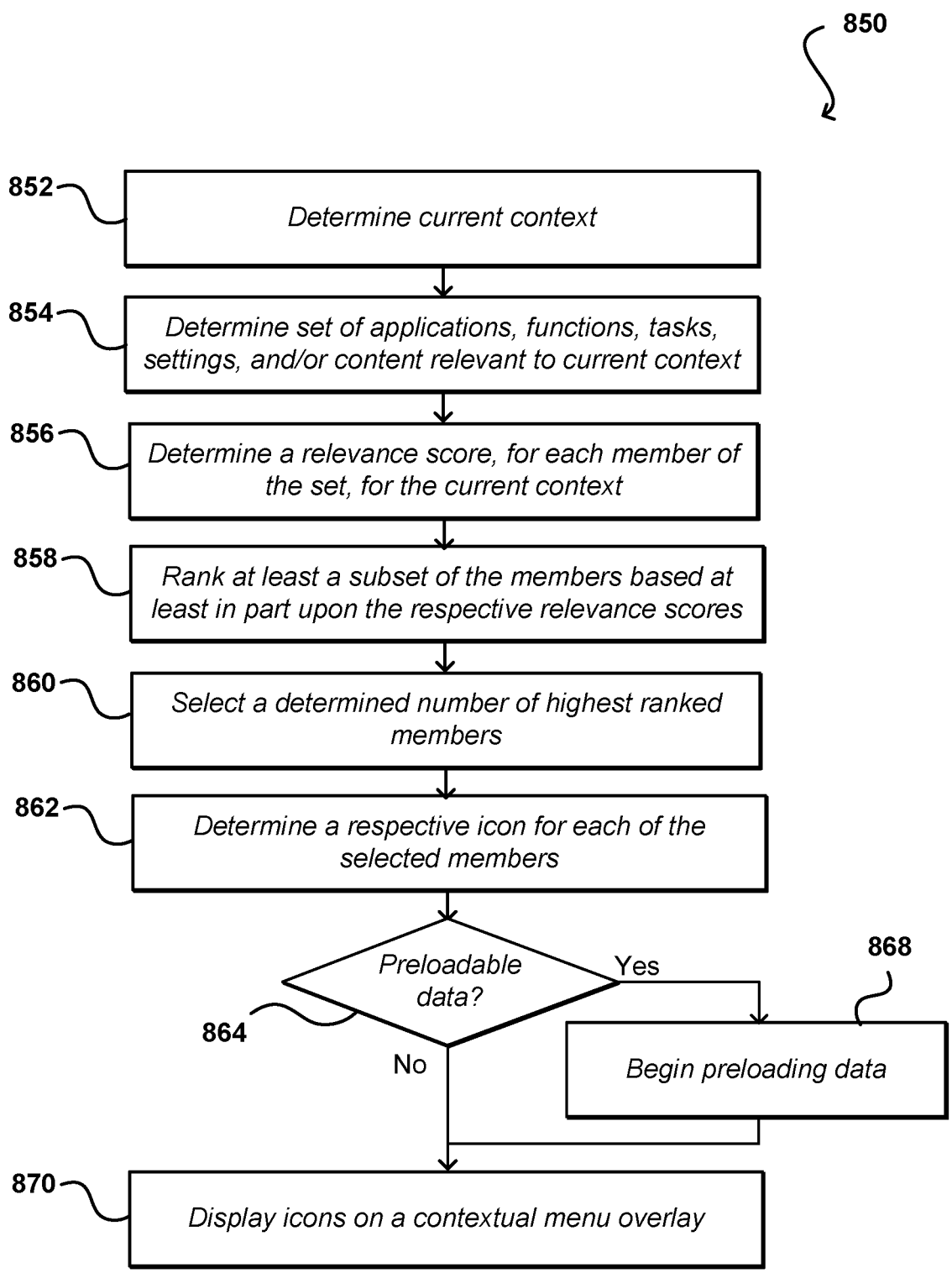

FIG. 8(b) illustrates an example process 850 that can be used to determine the relevant applications for a current context, such as is discussed above with respect to step 808. In this example, the current context is determined 852 using processes discussed herein that analyze available contextual and other such data. Based at least in part upon the current context, a set of applications, functions, tasks, settings, and/or content is determined 854 that is at least somewhat relevant to that context. In at least some embodiments, each member of this set can be tagged or otherwise associated with at least one particular context, as discussed elsewhere herein. A relevance score can be determined 856 for each member of the determined set. The relevance score can be determined in at least some embodiments by analyzing the available information discussed elsewhere herein, such as may include location, pattern, usage, user, orientation, motion, preference, history, or other such information. For example, a user at home with a device in landscape orientation may be much more likely to launch a movie player application than a work email application or a navigation application. Once the relevance scores are determined, at least a subset of the members of the set can be ranked 858 based at least in part upon these scores. In some embodiments, only members with at least a minimum relevance score will be considered for recommendation. It should be understood that similar measures, such as confidence scores and the like, can be used as well in other embodiments.

A determined number of the highest ranked members then can be selected 860 to be recommended to a user. In some embodiments this number may be fixed, while in others it might vary based upon the relevance scores of the applications, size of the display screen, activity of the user, or other such information. A respective icon for each of the selected members can be determined 862, which as discussed can vary depending upon the recommendation. For example, a general icon for a media player might be displayed in some situations, while a specific icon for a specific movie to be played using that player might be displayed in others. A determination can be made 864 as to whether there is preloadable data (or at least advantageously preloadable data) for any of the applications to be recommended. If so, the data can begin to be preloaded 868, transferred, downloaded, or otherwise obtained. As discussed, the preloading of data can also be prioritized based on the relevance score of the respective set member in at least some embodiments. The determined icons can be displayed 870 on a contextual overlay enabling the user to select one of the icons, such that the respective application or content can be accessed, for example, and if any information or content was preloaded it can be available with minimal latency in at least some embodiments.

As mentioned, such approaches enable users to more quickly and easily locate, launch, and/or utilize applications and functionality that is relevant to them at a current time and location. With people having an increasing number of applications on their mobile devices and actively using more of the installed applications, the conventional approach of having multiple pages of applications, organized in grids and pages, is becoming less and less useful. Users generally have to manually create folders, populate them with application icons and anchor the folders on the home screen in order to make applications easily accessible. As mentioned, this takes away prime home screen real-estate that could be populated with valuable information. For example, instead of having the home screen filled with folders and application icons, it could show driving directions or traffic info when it is determined that the user is commuting. Similarly, a device could display an item the user has viewed in the past on a shopping website (or a wish-list item) if the price of the item has dropped.

While approaches in accordance with various embodiments can enable a user to more quickly access applications and functionality that are likely to be of use based on past usage patterns and other such information, the various approaches should still enable a user to locate other applications, data, and functionality as desired. With the current design of pages and grids of application icons, the user can always find the application he or she is looking for (even if it is inefficient). Various embodiments do not stop the user from being able to access any application installed on the device. The approaches can allow the user to use the same actions to reach the desired application. For example, a user can go to the installed applications page and navigate to the desired application. Various embodiments are reliable in the same way where taking the same actions will have the same results. The interface overlays in at least some embodiments should be at least somewhat intuitive for users of mobile device to be able to adopt the overlays. Conventional approaches do not allow a user to access an application while in a different application (at a system level). The user has to leave the current application by going to home first and then selecting the desired application. Approaches in accordance with various embodiments enable the user to switch an application while running a different application. In a conventional design, application icons can be spread across the full screen. When the user is holding the device in one hand, it can be difficult to reach the icon on the far end of the screen with the same hand (and impossible on the larger tablets). Approaches in accordance with various embodiments can enable the launching of any application with ease, no matter how the user is holding the device.

Approaches in accordance with at least some embodiments therefore can be built around the concept that, instead of having the user of a device hunt for the icon they want, the icon should "come" to the user, or at least be quickly and easily accessible, such as by using a single motion or gesture. Based on observations of usage of mobile devices, a person holding a mobile phone device with the right hand generally would be able to tap the center right of the screen with ease. A person holding the device with the left hand only would be able to tap the center left of the screen with ease. Moreover, for devices with larger screens (e.g. 9-inch tables) holding the device with both hands still doesn't give the user a complete coverage of the touch screen. In most cases the user has to move the table to rest fully on an open palm while they reach for the icons spread out all across the screen with the other hand.

As mentioned, a contextual interface overlay-based approach can easily reposition icons on the screen, avoiding the need to change the way the user is holding the device in order reach different areas of the touch screen. Instead the user can drag application icons around until the desired icon is where it is most convenient for the user to select (i.e., tap). Furthermore, such an approach can determine which application the user is most likely to use next. This allows the application icons to be arranged on the overlay in such a way as to minimize the need for dragging applications icons around. In certain circumstances, when the user launches a contextual interface overlay the desired icon would show on the center right or center left as appropriate. The user then would only have to tap or release proximate the icon to launch the associated application.

In some embodiments, the various context interface layers can each be associated with a different category. Categories can be thought of as logical groupings of applications, each related to a particular context. These categories can be created manually by the user (e.g. favorites) or automatically (e.g. recently used, applications used at home, or applications used at work). As mentioned, the overlays can have the appropriate category active, as determined using context information, while enabling a user to navigate to other categories. At any given time only one of the categories will be active in at least some embodiments, and that category will show the dynamically selected application icons within that category. The user in some embodiments can navigate between categories by swiping in a particular direction, such as up, down, right, left, diagonal, etc. Changing the active category does not change the position of the icons, as the icons displayed are instead replaced with a new set of icons corresponding to the new category. As an example, when the device is held in the right hand, the user can swipe right to activate the next category and swipe left to activate the previous category. On the other hand, when the device is held in the left hand, a swipe left can activate the next category and a swipe right can activate the previous category. As mentioned, the rotary and column launcher are just examples of possible implementations. The style of the overlays can be based at least in part on the type of device. For example, a rotary overlay might work best for a mobile phone device with a screen that is less than five inches, while a half-circle overlay might work best for tablets with screens of diameter nine inches or more. The column overlay could be used for devices that have a narrow but long screen, such as a touch remote controller.

After a user activates the desired category, or the category is automatically activated as discussed herein, the user can select the application he or she wants to launch. In some embodiments the user can tap the area of the display associated with an icon in order to launch the associated application. In other embodiments, the user can scroll and/or rotate the contextual interface overlay and tap, with the user able to scroll/rotate through the icons by swiping in the appropriate direction(s) until the desired application is within easy reach. The user can tap the area associated with the icon to launch the application. In still other embodiments, a user can perform a tap, hold, and release motion. In these embodiments, there can be an "action zone" located based at least in part on the style of the overlay and the hand in which the device is held. When an application icon is in the "action zone," releasing the tap will launch the application associated with that icon.

As mentioned, in at least some embodiments the icons on an overlay can be sorted or otherwise arranged based at least in part upon a likelihood of use, with the most likely item starting at the "action zone" and having the next likely icons before and after, and so on. Such an approach enables the user to travel the least amount of distance to reach a desired item. A potential downside for some users is that the order in which the items show up will change, which could get confusing. In some embodiments the order or arrangement of the icons can be maintained, but the user may be able to "hard" swipe (think fling) the list to cause the overlay to cycle through the list of icons and land on the most likely item. Furthermore, an application icon could have various associated actions or shortcuts. For example, when a user is selecting an icon for an email application the user could be presented with three options: compose, calendar, and contacts. By swiping or tapping in the appropriate direction, the email application could be launched open to the appropriate page or state. There could be similar actions available per item where releasing the icon by swiping up/down/left/right could do different actions.

In some embodiments, the contextual interface overlay is initiated by a swipe motion, as discussed. In conventional approaches a user has to press the "Home" button, which will take the to the home screen where the user can select an application, or display all the applications to select the desired one. Instead of having a dedicated screen for an application launcher, approaches in accordance with various embodiments. In some embodiments the overlay can be available at a system level as a pane hidden from view. The user can swipe anywhere from the edge of a touch screen (or similar element) toward the center of the screen, which can cause the contextual interface overlay to be displayed. The location of the overlay can be based at least in part upon the location and direction in which the user swiped. For example, if the user swipes from the right to left, the overlay can be displayed on the right, centered vertically along the swipe direction. This allows the user to access the launcher while holding the device in a single hand. To dismiss the overlay in some embodiments, the user can tap the center of the overlay and drag the launcher back to (or past) the edge of the screen, or perform another such action.

In at least some embodiments, information for a user can be determined by creating a statistical regression profile that can be used to track the applications that a user launches, exits, or switches to, over a multi-week time frame. Over time the profile can be used to determine, for any given time during the day, which applications are most likely to be utilized. This can also be expanded to learn the applications most likely to be used for a given location, sequence of actions, etc. This information can eventually be utilized, such as in response to a minimum confidence threshold being reached, to select a number of icons (e.g., four to ten) to be displayed for each category or context on the appropriate overlay. In some embodiments the UI can begin with a single category or overlay until there is sufficient information to warrant additional contexts or overlays, and sufficient confidence to be able to segregate the applications by context. In some embodiments the time window being investigated is segmented, from a highest level such as a weekly profile. Such implementation can be beneficial, as usage will generally change between weekdays and the weekend. The profile can also be segmented into 10, 15, or 20 minute segments each day, for example, with weekdays potentially getting smaller segments than weekends due to the relative amount of activity. The amount of time spent using an application can be tracked for each segment or bucket of time. The results can be refined over time in order to update the probabilities, such as by averaging the ratios.

Additional approaches can be used as well, as there may not be sufficient data at certain times to make a prediction with an acceptable level of confidence. For example, in the middle of the night on a week night there might historically be very little activity. Accordingly, overall user usage might be monitored to determine applications that users tend to use at this time of night while at home, such as flashlight applications, emergency services, and the like. Such information can be a combination of contextual inference and statistical refining over time. In some embodiments there might be one or two slots reserved for certain types of recommendations, such as advertising, suggestions, globally selected icons, and the like.

Various other patterns can be recognized and/or identified as well. For example, a device might determine applications that a user accesses when commuting, such as riding on a bus or train. At least one device sensor can be used to determine the location and approximate rate of speed to determine applications that the user utilizes during the commute at a time of day and day of week. If the user has a limited data plan and does not stream much data while commuting, the device can prioritize applications accordingly. The user might check email and calendar applications, but not engage in teleconferences, so the applications can be ranked using this information. The pattern recognition algorithms also can look at information such as the peripherals to which the device is connected. If the device is connected to a Bluetooth audio component then there is a good chance the user will utilize a media application. If the device is connected to the user's car, then it can be likely that the user is driving.

In some embodiments, the pattern recognition analysis starts with the weekly analysis then adds in the geolocation and other such data. Global information can be used as well as user-specific information. Information also can include the type of device as well as the type of user. Instead of looking at which application is running every second, the process can look to application starts and stops for a particular time bucket, and can look to the other contextual information available at that time. A duty cycle can be computed over a time window of fifteen minutes, for example, and every day can be segmented into these buckets of 15 minutes. It might be determined that one application was used on average for 5% of a given bucket of time, one for 25%, etc. This can be performed over and over, day after day and week after week, with the results being averaged using a moving average with some type of decay to favor more recent trends. A sliding window of four weeks might be used, which provides enough data for a confidence determination while not causing a game that a user quit playing a month ago to still appear as a recommended icon. The apps suggested for a given context thus can also change over time. When an overlay is to be displayed, the device can determine the appropriate bucket (in terms of time of day), and those duty cycles can be used to rank the applications. Since a single bucket might not provide enough data, the determination may need to utilize data from one or more adjacent time buckets, potentially with an appropriate weighting to favor data in, or closer to, the current bucket. The data then can be averaged out, such that the results are within the statistical regression profile.

The process can also potentially identify when different contexts are appropriate. For example, the device might be able to determine based on location that the user is on vacation or is taking a day off work. Thus, the user might be presented for overlays that may not normally be displayed. A user can also have the option to create contexts, add or remove items to specific contexts, or otherwise customize the interface overlays in at least some embodiments. As discussed, the different contexts enable different icons to be displayed based on applications that are determined to be relevant based on the current contextual information, such that the same pixels of the display screen when having associated input can cause different applications to be launched. Similarly, the same motion by the user can cause different applications to be launched based at least in part upon the context.

And, as discussed, the sequence with which a user performs certain actions can be utilized as well. As an example, when a user arrives at home the user might typically check email to finish work, then quickly open a social media application, then open a media serving application to watch TV shows or movies. This might generally occur around 7-8 pm every night. When the user subsequently arrives at home and utilizes the email application, the user afterwards does not typically want the email application to be shown again when the user exits the email application. Accordingly, because the user has already used the application and is not very likely to use it again right away, the social media application icon can be featured followed by the media serving application, with the email application icon not being displayed at all. Similarly, once the social media application is closed the media serving application may be prioritized, with the social media app not appearing on the overlay. Since people are fairly predictable in their habits, devices should be able to make recommendations for them based on that predictability. Various other information can be used to determine the appropriate context as well, such as battery power, whether the user is walking or biking, etc. When a user is performing an action such as jogging, the number of icons might be reduced and the size increased in order to make it easier for the user to utilize given the current context.

Figure 9:
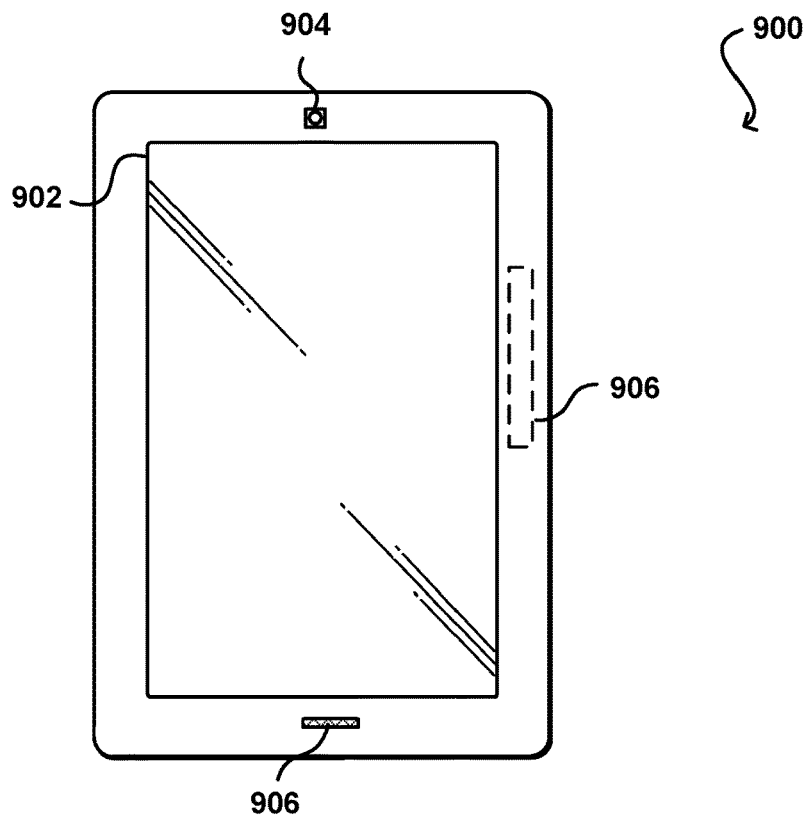
FIG. 9 illustrates an example device that can be used to implement aspects of the various embodiments.

FIG. 9 illustrates an example electronic user device 900 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 900 has a display screen 902 on the front side, which under normal operation will display information to a user facing the display screen (e.g., on the same side of the computing device as the display screen). The computing device in this example includes at least one camera 904 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 900 also includes at least one microphone 906 or other audio capture device capable of capturing audio data, such as words or commands spoken by a user of the device. In this example, a microphone 906 is placed on the same side of the device as the display screen 902, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 900 also includes at least one orientation sensor 908, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 10:
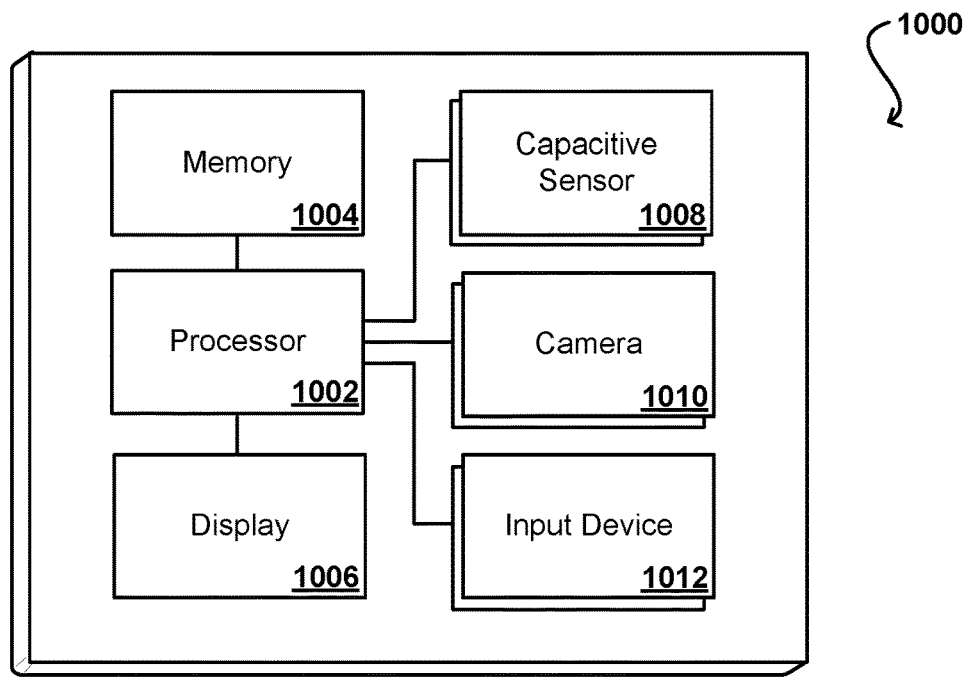
FIG. 10 illustrates example components of an example device such as that illustrated in FIG. 9.

FIG. 10 illustrates a logical arrangement of a set of general components of an example computing device 1000 such as the device 900 described with respect to FIG. 9. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one image capture element 1008 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1012, such as a mono or stereo microphone or microphone array, operable to capture audio information from at least one primary direction. A microphone can be a uni- or omni-directional microphone as known for such devices.

In some embodiments, the computing device 1000 of FIG. 10 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1000 also can include at least one orientation or motion sensor 1010. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1002, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 11:
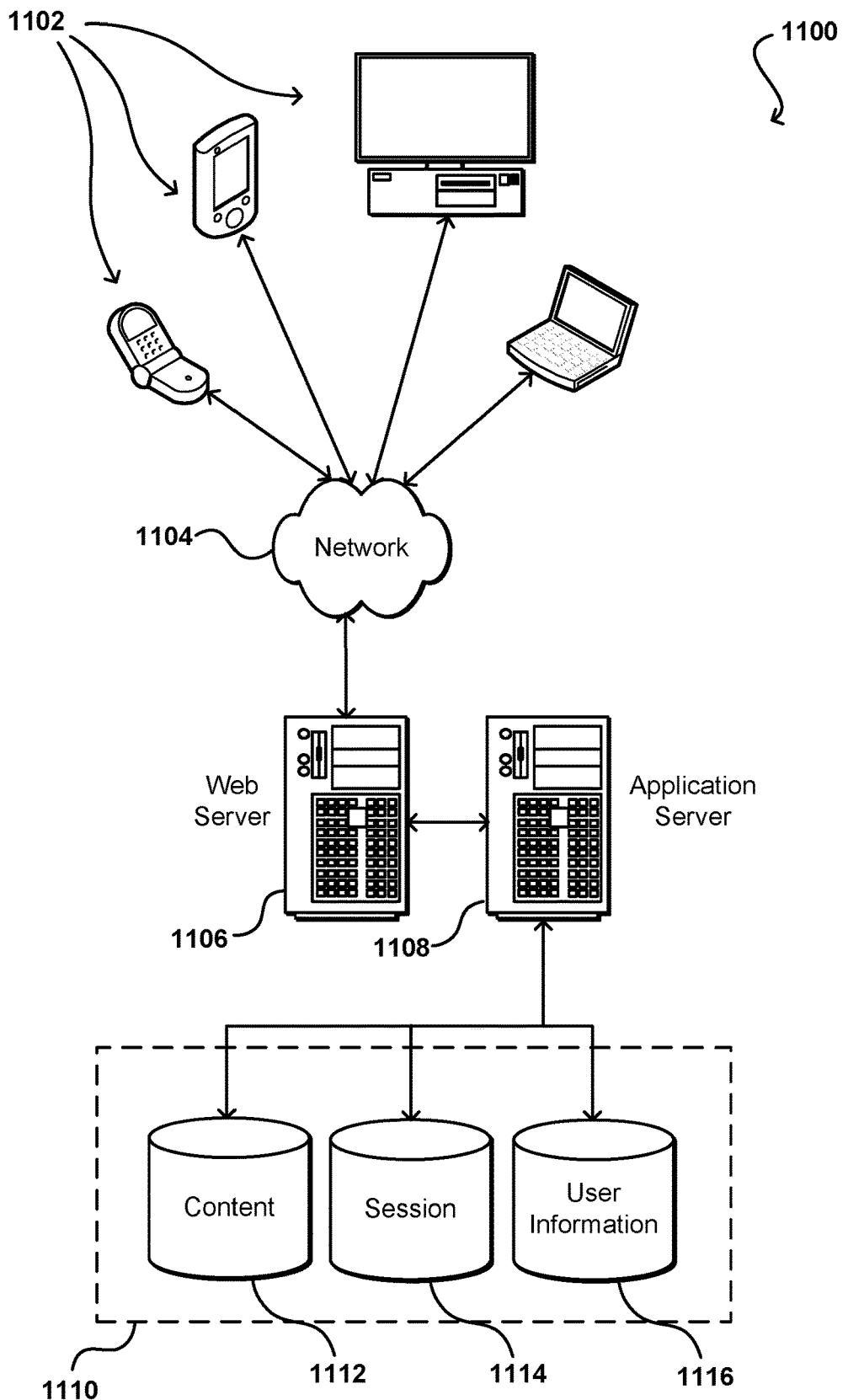
FIG. 11 illustrates an example environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1102. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
  determining, at a first time, a context corresponding to a computing device;

displaying, on a screen of the computing device, a home screen including a first icon associated with a first application;

determining information corresponding to a second application;

detecting, using the computing device, a first gesture;

in response to detecting the first gesture, displaying, on the screen, a display element including the information;

detecting, using the computing device, a second gesture;

selecting, by the computing device and based at least in part on the context, a third application corresponding to the context, the third application having been configured to operate with respect to the computing device prior to the first time; and in response to detecting the second gesture, displaying, on the screen, a second icon associated with the third application.

2. The computer-implemented method of claim 1, wherein determining the information comprises:

determining that the second application is associated with the computing device; and receiving, from the second application, data corresponding to the information.

3. The computer-implemented method of claim 1, further comprising:

in response to detecting the first gesture, displaying, on the screen, a first overlay associated with the display element; and in response to detecting the second gesture, displaying, on the screen, a second overlay associated with the second icon.

4. The computer-implemented method of claim 1, further comprising:

selecting the second application based on at least one of: a location of the computing device, a viewing history corresponding to the second application, or a purchase history corresponding to the second application.

5. The computer-implemented method of claim 4, further comprising:

selecting a fourth application based on at least one of: the location, the viewing history, or the purchase history;

determining a first relevance score for the second application;

determining a second relevance score for the fourth application; and determining to display the display element based at least in part on the first relevance score and the second relevance score.

6. The computer-implemented method of claim 1, further comprising:

determining a user profile associated with the computing device; and determining that the user profile includes an indication of the second application.

7. The computer-implemented method of claim 1, wherein determining the context comprises at least one of:

determining a usage pattern corresponding to the computing device;

determining a location of the computing device;

determining a time of day; and predicting a next use of the computing device.

8. The computer-implemented method of claim 3, wherein displaying the first overlay comprises:

causing the first icon to appear to move from an edge of the screen.

9. The computer-implemented method of claim 1, further comprising:

receiving a notification associated with the third application; and displaying, on the screen, second information corresponding to the notification.

10. The computer-implemented method of claim 1, wherein determining the context comprises at least one of:

determining user information including at least one of an identity of a user of the computing device, a gender of the user, a type of user, or a handedness of the user.

11. A system comprising:

at least one processor; and at least one memory including instructions that, when executed by the at least one processor, cause the system to:

determine, at a first time, a context corresponding to a computing device;

display, on a screen of the computing device, a home screen including a first icon associated with a first application;

determine information corresponding to a second application;

detect, using the computing device, a first gesture;

in response to detection of the first gesture, display, on the screen, a display element including the information;

detect, using the computing device, a second gesture;

select, by the computing device and based at least in part on the context, a third application corresponding to the context, the third application having been configured to operate with respect to the computing device prior to the first time; and in response to detection of the second gesture, displaying, on the screen, a second icon associated with the third application.

12. The system of claim 11, wherein the at least one memory further comprises instructions to determine the information that, when executed by the at least one processor, further cause the system to:

determine that the second application is associated with the computing device; and receive, from the second application, data corresponding to the information.

13. The system of claim 11, wherein the at least one memory further comprises instructions to determine the information that, when executed by the at least one processor, further cause the system to:

in response to detecting the first gesture, display, on the screen, a first overlay associated with the display element; and in response to detecting the second gesture, display, on the screen, a second overlay associated with the second icon.

14. The system of claim 11, wherein the at least one memory further comprises instructions that, when executed by the at least one processor, further cause the system to:

select the second application based on at least one of a location of the computing device, a viewing history corresponding to the second application, or a purchase history corresponding to the second application.

15. The system of claim 14, wherein the at least one memory further comprises instructions that, when executed by the at least one processor, further cause the system to:

select a fourth application based on at least one of the location, the viewing history, or the purchase history;

determine a first relevance score for the second application;

determine a second relevance score for the fourth application; and determine to display the display element based at least in part on the first relevance score and the second relevance score.

16. The system of claim 11, wherein the at least one memory further comprises instructions that, when executed by the at least one processor, further cause the system to:

determine a user profile associated with the computing device; and determine that the user profile includes an indication of the second application.

17. The system of claim 11, wherein the at least one memory further comprises instructions to determine the context that, when executed by the at least one processor, further cause the system to:

determine a usage pattern corresponding to the computing device;

determine a location of the computing device;

determine a time of day; or predicting a next use of the computing device.

18. The system of claim 13, wherein the at least one memory further comprises instructions to determine the first overlay that, when executed by the at least one processor, further cause the system to:

cause the first icon to appear to move from an edge of the screen.

19. The system of claim 11, wherein the at least one memory further comprises instructions that, when executed by the at least one processor, further cause the system to:

receive a notification associated with the third application; and display, on the screen, second information corresponding to the notification.

20. The system of claim 11, wherein the at least one memory further comprises instructions to determine the context that, when executed by the at least one processor, further cause the system to:

determine user information including at least one of an identity of a user of the computing device, a gender of the user, a type of user, or a handedness of the user.

* * * * *